United States Patent Office 3,120,198
Patented Feb. 4, 1964

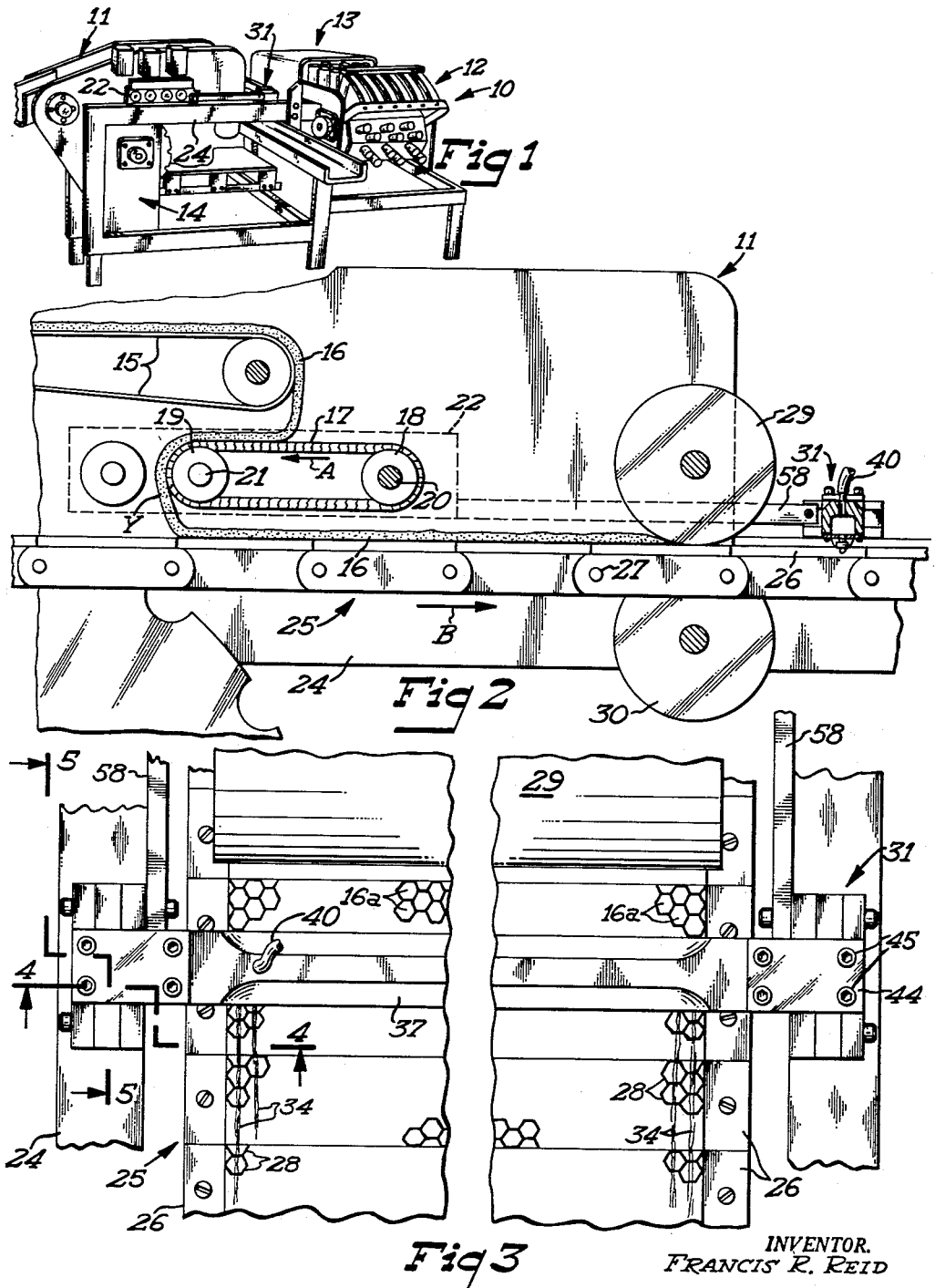

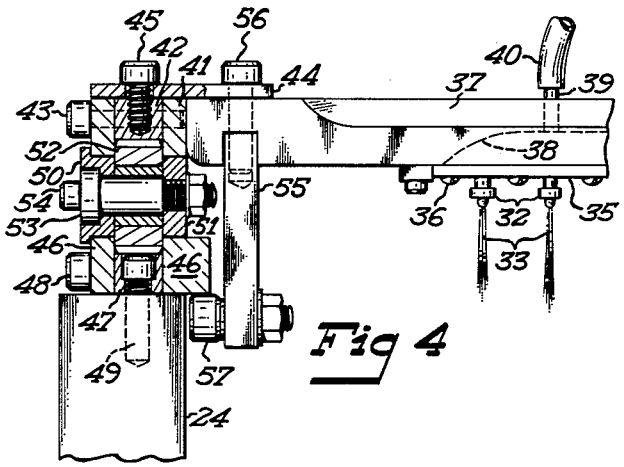
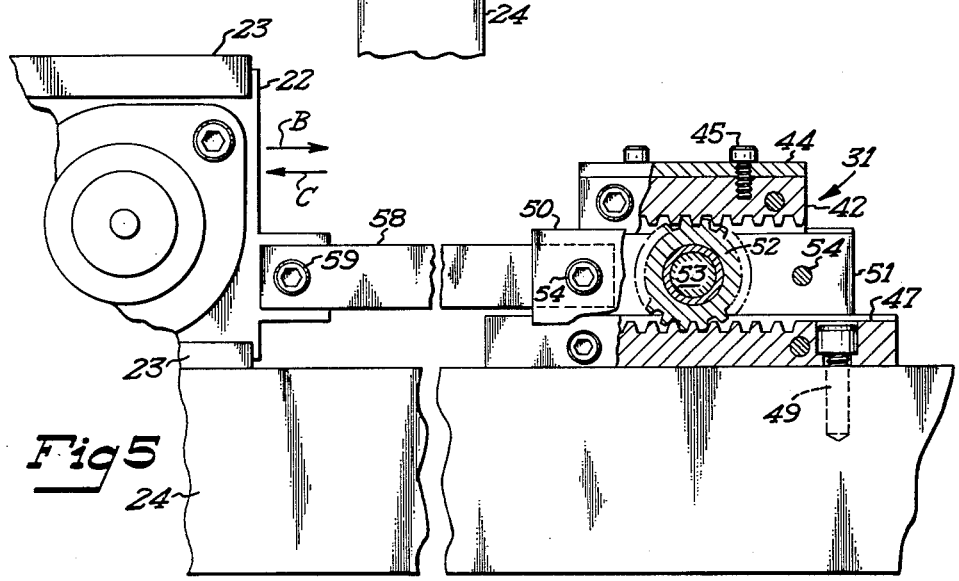
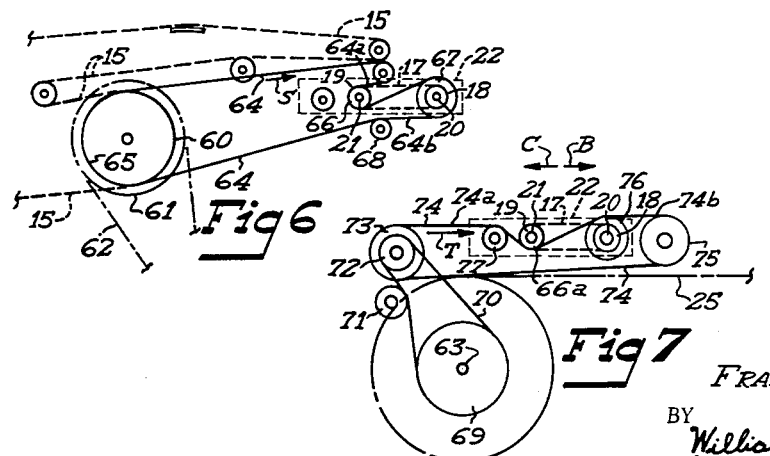

3,120,198
DOUGH MACHINE
Francis R. Reid, Pleasure Ridge Park, Ky., assignor to The Pillsbury Company, Minneapolis, Minn., a corporation of Delaware
Filed Feb. 9, 1962, Ser. No. 172,130
5 Claims. (Cl. 107—69)

This invention relates to a dough blanket conveying and treating machine and more specifically relates to a machine for receiving a continuous dough blanket, forming the dough blanket into individual wafers or biscuits and then applying a predetermined quantity of liquid oil onto each of the biscuits to prepare the biscuits for packing into containers.

This application is related to the subject matter disclosed in my co-pending applications for United States Letters Patent, S.N. 58,018, filed September 23, 1960, and entitled Packer, and S.N. 144,812, filed Oct. 9, 1961, and entitled Method and Apparatus for Handling Dough and the Like.

Although mechanisms for applying oil to biscuits being formed from a dough blanket have been known previously, such mechanisms have been unduly complicated and have generally employed a plurality of individual applicators or wipers for individually applying a minute quantity of liquid oil to each individual biscuit by engaging the biscuit and essentially swabbing on a quantity of oil. Such mechanisms have been unduly expensive and complicated for carrying out the purpose intended. It has not always been possible to uniformly apply a predetermined quantity of oil to each biscuit and further, because each biscuit has been individually treated by engaging the biscuit, high speed operation was found to be impractical and substantially impossible.

An object of my invention is to provide a new and improved apparatus for applying a predetermined quantity of liquid onto a dough blanket per unit of length of the blanket, and which is necessarily being conveyed intermittently and cyclically to facilitate operation of packing apparatus.

Another object of my invention is to provide a novel method of applying liquid oil in uniform amounts to all portions of a dough blanket being moved intermittently and cyclically.

Still another object of my invention is the provision of an improved and novel apparatus for forming individual biscuits from a continuous blanket of dough and to consistently and uniformly apply to each of the biscuits, a minute line or ribbon of liquid oil to each of the formed biscuits.

These and other objects and advantages of my invention will more fully appear from the following description made in connection with the accompanying drawings wherein like reference characters refer to similar parts throughout the several views and in which:

FIG. 1 is a general perspective view of a biscuit-forming and can packing machine incorporating the present invention;

FIG. 2 is a detail longitudinal section view of the dough-receiving and biscuit-forming and treating portion of said machine;

FIG. 3 is a detail top plan view of a portion of the mechanism illustrated in FIG. 2;

FIG. 4 is a detail section view taken on a vertical plane substantially as illustrated at 4—4 in FIG. 3;

FIG. 5 is a detail elevation view, partly in section and taken substantially on a broken line as indicated at 5—5 in FIG. 3; and FIGS. 6 and 7 are diagrammatic line drawings illustrating the chain drive and conveyor apparatus.

The machine, indicated in general by numeral 10 in FIG. 1 includes dough-supplying and cutting apparatus, indicated in general by numeral 11; can-conveying apparatus 12; and apparatus at a packing station 13 for inserting dough biscuits into the cans by means of plungers. Such apparatus as is designated 12 and 13 is more fully illustrated in my co-pending application S.N. 58,018. The can-conveying and biscuit-packing apparatus 12 and 13 respectively form no part of the present invention except as to say that both the dough and the cans are moved intermittently and cyclically and periodically remain stationary so as to permit upwardly moving plungers to lift cut dough biscuits into the cans while the cans and dough are stationary on their respective conveyors at the packing station 13. At the time of packing, the cans carried by the apparatus 12 are in inverted or open-bottomed position and the dough biscuits are uplifted by plungers engaging their bottom sides, into the cans. The dough-conveying appartus 11, can-conveying apparatus 12 and the packing mechanism at station 13 are all powered from a common source of power and are synchronized in relation to each other by mechanism indicated in general by numeral 14.

The dough-supplying and biscuit-forming mechanism 11 includes a constant speed continuously moving belt conveyor 15 over which a substantially continuous and endless blanket 16 of dough is supplied. The blanket 16 descends from the end of conveyor 15 onto a second conveyor 17 which in the form shown, is constructed of a plurality of individual and side-by-side endless springs trained around adjacent pulleys or sheaves 18 and 19 which are respectively carried by shafts 20 and 21. The shafts 20 and 21 are supported upon a pair of sub-frame plates or shuttle frames 22 which are mounted for longitudinal reciprocation by means of tracks or channels 23 which are affixed to the main frame 24 of the machine 10. It will be seen that the dough blanket 16 is carried by conveyor 17 rearwardly in the direction of arrow A and the dough descends onto a dough cutter-conveyor 25. The dough conveyor 25 is moved cyclically and intermittently in the direction of arrow B at an overall average velocity identical to the speed of conveyor 15. The conveyor 25, during each cycle of operation, dwells or is stationary for a predetermined portion of the operating cycle, and likewise, the conveyor 25 indexes or moves during a predetermined portion of the operating cycle. In the specific embodiment, the conveyor 25 dwells for two-thirds or 240° of the operating cycle, and indexes during the remaining one-third or 120° of the operating cycle. Both of the conveyors 15 and 25 travel an identical distance during the time of each operating cycle and in the form shown, each of the conveyors 15 and 25 travels four and five sixteenths inches in each operating cycle, it being understood, of course, that the entire travel of conveyor 25 occurs during the final one-third of the operating cycle and as a result the instantaneous velocity of the conveyor 25 during indexing substantially exceeds the instantaneous velocity of conveyor 15.

In order to provide for transfer of the dough blanket 16 from conveyor 15 to conveyor 25 without stretching or otherwise deforming the blanket so as to change the weight of dough blanket per unit or blanket area, the reciprocating shuttle frame 22, together with the conveyor 17 thereon, forms a loop as indicated at Y in the dough blanket which successively increases and decreases in length during the dwell portion of the operating cycle of conveyor 25 and during the index portion of the operating cycle respectively. It will be noted that the shuttle frame 22 moves quickly in the forward direction of arrow B during one-third of the operating cycle and moves relatively slowly rearwardly in the direction of arrow C during two-thirds of the operating cycle.

The dough cutter conveyor 25 comprises a plurality of conveyor segments 26 which are arranged in side-by-side relation with each other and are interconnected by pivots 27 and each of the segments 26 is made up of an open gridwork defining a plurality of hexagonal biscuit cutters 28 related with each other so as to prevent wastage of dough between next adjacent biscuits formed by the cutters when the dough is pressed into the cutters by means of a presser roll 29. The presser roll 29 is journalled on the frame 24 with the periphery thereof in engagement with the top edges of the gridwork cutters 28 and as seen in FIG. 2, presses the dough blanket 16 into the cutters. A supporting roller 30 is also journalled on the frame 24 immediately beneath the presser roll 29 and also engages the bottom of the gridwork cutters 28 for supporting the gridwork at the point of pressing the dough into the cutters. The cutter conveyor 25 is described in more detail in my co-pending application for United States Letters Patent executed October 4, 1961, and entitled Dough Cutter, S. N. 145,872, filed October 18, 1961.

After the dough has been pressed into the cutters, thereby forming a plurality of dough biscuits 16a, a predetermined quantity of liquid oil is applied to each of the dough biscuits 16a by an oiler mechanism indicated in general by numeral 31. The oiler mechanism includes a plurality of nozzles 32 having downwardly directed outlets and each of the nozzles 32 is placed above the cutter conveyor 25 and in alignment with one of the longitudinally extending rows of cutters 28 and dough biscuits 16a so as to direct a stream 33 of oil downwardly onto the dough biscuits carried by the cutter conveyor 25 and applying a ribbon or line 34 of oil on the dough blanket, which has at this stage been severed into biscuits in the cutters 28.

The nozzles 32 are threaded into a rigid mounting plate 35 which is affixed by means of screws 36 to a rigid mounting member 37. The plate 35 is provided with a suitable gasket at the surface of engagement with the mounting 37 to provide an adequate liquid seal between the plate 35 and a hollow interior oil-distributing chamber 38 formed within the member 37 and defining a manifold supplying oil to all of the nozzles 32. Oil is supplied into the opening 38 by any suitable means such as a nipple 39 threadably secured in the member 37 and attached to an oil supply hose 40 which may be connected to a suitable source of supply of oil, such as an elevated tank or a pump.

Means are provided for movably mounting and reciprocating the member 37 in a direction longitudinally of the cutter conveyor. In the form shown, such means includes a pair of slides 41 disposed on opposite sides of a linear downwardly facing gear rack 42 which are secured together by screws 43 and affixed to the member 37 by a mounting plate 44 and screws 45. Similar slides 46 are mounted on opposite sides of an upwardly facing linear gear rack 47 and are affixed thereto by screws 48 and are affixed to the frame 24 of the machine by screws 49 in opposed relation with the slides 41 and the rack 42. Additional slides 50 and 51 are respectively disposed between the slides 41 and 46 to engage and move therealong, and a rotary pinion or gear 52 is journalled on a mounting pin or bolt 53 which extends through and clamps to slides 50 and 51. The gear 52 meshes with the racks 42 and 47 for rolling therealong. The gear mounting slides 50 and 51 are additionally secured together in fixed relation with each other by bolts 54. Brackets 55 are secured on opposite ends of member 37 as by screws 56 and carry rollers 57 which engage the lower sides of the inner stationary slides 46 for rolling therealong and holding the member 37 downwardly to maintain the gear 52 in mesh with the racks 42 and 47. The slides 50 and 51 are secured by bolts 54 to interconnecting drive links 58 which are connected by bolts 59 to the frame plates 22 of the reciprocating shuttle.

It will therefore be seen that motion is imparted to the oiler nozzles 32 by the shuttle frame 22; and that the motion of the shuttle frame is multiplied by the gear 52 and the gear racks 47 and 42. The actual stroke length or throw of the reciprocating oiler is twice the throw or stroke length of the shuttle frame, but the nature of movement of the oiler is identical to that of the shuttle frame. In the specific embodiment disclosed, it will be remembered that the shuttle frame moves one and seven-sixteenths inches in the direction of arrow C during the dwell portion of the operating cycle or during the first two-thirds or 240° of the operating cycle and, during the final one-third or 120° of the operating cycle which constitutes the index portion, the shuttle frame moves in the direction of arrow B a distance of one and seven-sixteenths inches. As a result, the member 37 and nozzles 32 move in the direction of arrow C a distance of two and seven-eighths inches during the first 240° or two-thirds of the operating cycle which constitutes the dwell period; and during the final one-third or 120° of the operating cycle, constituting the indexing period, the member 37 and nozzles 32 move in the direction of arrow B through a similar distance of two and seven-eighths inches.

This movement of the oiler nozzles 32 actually provides a constant and uniform relative velocity between the nozzles 32 and the cutter conveyor 25 carrying the dough. The downwardly directed streams 33 of oil from the nozzles deposit uniform ribbons 34 of oil onto the longitudinal lines of biscuits 16a formed by cutters 28. It will therefore be seen that a uniform quantity of oil is applied to the dough carried by cutter conveyor 25 per unit of length of dough.

It will be noted that the proportion between the dwell period time during which the cutter conveyor 25 is stationary and the total time of an operating cycle of the cutter conveyor 25 (240°:360° or 2:3) equals the proportion between the length of stroke or throw of the oiler nozzles and the total length of cyclical movement of the cutter conveyor 25 (2⅞″:4 5⁄16″ or 2:3).

Even if the cutter conveyor has a different pattern of cyclical movement, said proportions equal each other and when this relationship is followed, the oil is supplied in uniform quantity per unit of length of dough carried by the cutter conveyor. For instance, if the length of cyclical movement (4 5⁄16″) of the cutter conveyor 25 remains the same, but the dwell period is reduced to 120°, then the length of stroke of the reciprocating nozzles would necessarily be changed to one and seven-sixteenths inches (or one-third of the total length of movement of cutter conveyor 25 per cycle); it being understood, of course, that the nozzles move in the direction of arrow B in the index portion of the cycle and move in the direction of arrow C during the dwell portion of the cycle; and it further being understood that a uniform quantity of oil per unit of length of dough blanket may be applied.

The reciprocating movement of the shuttle frame which is utilized in producing the reciprocating movement of nozzles 32 and in lengthening and shortening the loop Y in the dough blanket is produced by apparatus shown diagrammatically in FIGS. 6 and 7. The motion of the shuttle frame 22 and conveyor 17 is produced and controlled by the respective movements of conveyors 15 and 25 which are driven from the source of rotary power 14 at equal overall uniform velocities. Power source 14 continuously drives chain 62 for continuously driving conveyor 15; and the power source 14 is connected through an intermittently driving transmission to the conveyor 25 to produce intermittent movement thereof. The conveyor 15 is wrapped around a drum 60 which is driven by a sprocket 61 and chain 62; and the conveyor 25 is driven from a shaft 63. The continuous movement of the conveyor 15 is transmitted to a roller chain 64 by a sprocket 65 which is secured to one end of drum 60, and the chain 64 is trained over sprockets 65, 66, 67 and 68. The sprocket 66 is affixed on the shaft 21 which is also affixed to pulleys 19 of conveyor 17. Sprocket 67 is rotatably mounted on shaft 20.

The intermittent cyclical movement of conveyor 25 is transmitted by shaft 63 and sprocket 69 to a roller chain 70 which is trained over idler sprocket 71 and drive sprocket 72 which is affixed to sprocket 73. Another chain 74 is trained around sprocket 73 and around sprocket 75, over sprocket 76 which is rotatably mounted on shaft 20 and sprocket 66a which is of identical size to and is affixed to sprocket 66 and shaft 21 and the chain 74 is also trained over idler sprocket 77. The dough cutting conveyor is also moved substantially simultaneously with the can-conveyor apparatus 12.

It will be understood that during each operating cycle of conveyor 25 wherein the total travel is three units of distance, conveyor 15 will also travel three units of distance in this same unit of time, but in the disclosed embodiment the conveyor 15 travels continuously at a uniform speed at every instance. In contrast, however, the instantaneous velocities of conveyor 25 are not uniform because during two-thirds of the operating cycle the speed of conveyor 25 is zero and during the remaining one-third of the cycle the instantaneous speed of conveyor 25 is three times that of conveyor 15. However, the overall average velocities of conveyors 25 and 15 over the period of an operating cycle are identical.

It is pointed out that while conveyor 25 is stopped, the shuttle frame 22 moves rearwardly in the direction of arrow C, and while conveyor 25 is moving (during indexing) the shuttle frame 22 is moving forwardly in the direction of arrow B. While conveyor 25 remains stopped during the dwell portion of the cycle, the chain 74 is also stopped and tends to hold the sprockets 66a, shaft 21, and sprockets 66 against rotation, and therefore the pulleys 19 are held against rotation. However, conveyor 15 continues to move and the chain 64 also continues to move in the direction of arrow S; and as a result of the continuing travel of chain 64, sprocket 66 will be revolved and cause sprocket 66a and shaft 21 to revolve. A similar revolving of pulleys 19 results. Whereas chain 74 remains stationary, the rotation of sprocket 66a results in linear travel of the shuttle frame 22 and conveyor 17 in the direction of arrow A. The sprocket 66a actually crawls or creeps along chain 74. During this travel of shuttle frame 22, the runs 74a and 74b of chain 74 are respectively shortened and lengthened. During the dwell of conveyor 25 and travel of the shuttle frame in the direction of arrow C the upper run of conveyor 17 continues to travel in the direction of arrow A, both with respect to the shuttle frame 22 and with respect to the stationary frame 24. During the dwell portion of the cycle conveyor 17 moves one unit of distance (1 7/16") with respect to the shuttle frame 22 and during this same dwell period the shuttle frame 22 also moves one unit of distance (1 7/16") in the direction of arrow C; and as a result the total actual travel along the upper run of conveyor 17 during the dwell portion of the cycle is two units of distance (2 7/8"). This is precisely equal to the movement of conveyor 15 and dough blanket 16 during this same period. It will therefore be seen that as the dough blanket travels over the end of conveyor 15 and descends to conveyor 17 during the dwell portion of the cycle, the dough blanket 16 is carried rearwardly at the same rate of speed as the dough blanket is supplied. In this manner the dough blanket is looped downwardly and back upon itself as the dough leaves the constant speed conveyor 15. Because the dough is carried away by the conveyor 17 as fast as it is supplied by the conveyor 15, no stretching of the dough blanket 16 will occur during this transfer from conveyor 15 to conveyor 17.

During the dwell portion of the cycle the dough also descends from conveyor 17 to the conveyor 25 and is thereby looped downwardly and back upon itself at Y. As the shuttle moves rearwardly one unit of distance a similar length of dough blanket 16 is laid on the cutter conveyor 25, thereby increasing the length of loop Y in a rearward direction. It will be understood that during the rearward travel in the direction C of the shuttle frame, the conveyor 17 travels one unit of distance with respect to the shuttle frame to supply the proper length of dough to be laid down on conveyor 25 to permit the rearward travel of the shuttle without stretching the dough blanket.

During the index portion of the operating cycle of conveyor 25 the conveyor 25 travels three units of distance while conveyor 15 travels one unit of distance. Likewise chain 74 travels in the direction of arrow T three units of distance while chain 64 travels one unit of distance in the direction of arrow S. Chain 64 continues to turn sprocket 66 at a first speed and tends to turn sprocket 66a and shaft 21 in a similar manner. However, because chain 74 is traveling three units of distance during the index portion of the cycle, and thereby traveling thrice the speed of chain 64, the sprockets 66a are caused to revolve at a proportionate speed causing shaft 21 and sprocket 66 to revolve at a similar speed. The result of the speed differentials between chains 64 and 74 is rolling of the sprocket 66 in the direction of arrow B along the run 64a of chain 64 and a corresponding lineal movement of shuttle frame 22 in the direction of arrow B. During the index portion of the cycle the conveyor 17 moves rearwardly in the direction of arrow A with respect to the shuttle frame 22, two units of distance (2 7/8"); and because the shuttle frame moves one unit of distance in the direction of arrow B, the actual movement of conveyor 17 with respect to the stationary frame 24 is one unit of distance in the direction of arrow A so as to receive and carry away the dough blanket 16 at the identical rate at which the dough blanket is being supplied by conveyor 15.

Because the conveyor 17 is moving in the direction of arrow A with respect to the shuttle frame 22 two units of distance during the index portion of the cycle, the conveyor 17 supplies a corresponding length of dough blanket downwardly onto the conveyor 25, and because the shuttle frame 22 moves one unit of distance in the direction of arrow B during the indexing of conveyor 25, sufficient dough is supplied to the conveyor 25 so as to prevent any stretching of the dough as it is applied to conveyor 25. It will be understood that during the index portion of the cycle, the loop Y of the dough blanket is shortened by one unit of distance.

It will be understood that as run 64a of chain 64 is shortened during the movement of shuttle frame 22 in the direction of arrow B, the horizontal run 64b is accordingly lengthened. Similarly, during the movement of the shuttle frame 22 in the direction of arrow B, the runs 74a and 74b of chain 74 are respectively lengthened and shortened.

It will be understood that the diameters of sprockets 69, 72 and 73 are so related as to produce motion in chain 74 identical to that of conveyor 25. Likewise sprocket 65 is of such a size as to give chain 64 a velocity identical to that of conveyor 15. The diameters of sprockets 66 and 66a are identical and are identical to the diameters of pulleys 19 so as to produce the desired motion of conveyor 17.

As a result of the movement of the shuttle frame 22, the oiler nozzles 32 are reciprocated to the proper rate to produce a uniform predetermined relative velocity between the nozzles 32 and the cutter conveyor 25, and thereby continuously apply, from the continuously open nozzles 32, a predetermined quantity of liquid oil into the dough per unit of length of the dough.

It will, of course, be understood that various changes may be made in the form, details, arrangement and proportions of the parts without departing from the scope of my invention which consists of the matter shown and described herein and set forth in the appended claims.

What I claim is:

1. In combination with a conveyor moving forwardly, cyclically, and intermittently through a first distance during each cycle for carrying a blanket of dough; oil applying apparatus comprising a source of liquid oil, a distributing manifold connected to said source and extending across said conveyor and spaced thereabove, said manifold having a plurality of continuously open and downwardly directed outlets directing continuous streams of oil onto the dough blanket carried by the conveyor, means supporting said manifold for reciprocation longitudinally of the conveyor and drive mechanism cyclically moving said manifold forwardly during each intermittent movement of the conveyor through a second distance less than said first distance and moving said manifold rearwardly through said second distance while the conveyor is stationary, the proportion between said second distance and said first distance equalling the proportion between the time during which said conveyor is stationary and the total cycle time, whereby to apply a predetermined quantity of oil along each unit of length of the dough blanket on the conveyor.

2. In combination with a conveyor moving forwardly cyclically, and intermittently through a first distance during each cycle for carrying a blanket of dough; oil-applying apparatus comprising a source of liquid oil, a distributing manifold connected to said source and extending across said conveyor and spaced thereabove, said manifold having a plurality of continuously open downwardly directed outlets directing continuous streams of oil onto the dough blanket carried by the conveyor, means supporting said manifold for reciprocation longitudinally of the conveyor, and drive mechanism cyclically moving said manifold forwardly during each intermittent movement of the conveyor through a second distance less than said first distance and also moving said manifold rearwardly through said second distance while the conveyor is stationary, the manifold having a constant rate of movement in a rearward direction with respect to the conveyor.

3. In combination with a conveyor moving forwardly, cyclically and intermittently through a first distance during each cycle for carrying a blanket of dough, the conveyor being stationary for a first period of time which is less than the cycle time of the conveyor during which the conveyor is alternately stationary and moving; apparatus for applying a uniform quantity of liquid onto the dough blanket per unit of length thereof and comprising a source of liquid, a plurality of downwardly directed nozzles positioned above the conveyor and directing continuous streams of liquid onto the dough blanket carried by the conveyor, a mounting for said nozzles and extending across the conveyor in spaced relation thereabove, means supplying liquid to said nozzles, means supporting mounting for reciprocation longitudinally of the conveyor, and drive mechanism cyclically moving said mounting forwardly during each intermittent movement of the conveyor through a second distance less than said first distance and also moving said mounting rearwardly through said second distance while the conveyor is stationary, the proportion between said first period of time and said cycle time equalling the proportion between said second distance and said first distance, whereby to apply a predetermined and constant quantity of liquid onto the dough per unit of length thereof as the dough is carried intermittently by said conveyor.

4. In combination with a conveyor moving forwardly, cyclically, and intermittently through a first distance during each operating cycle for carrying a blanket of dough, the conveyor remaining stationary and moving during two-thirds and one-third respectively of the operating cycle; apparatus for applying liquid onto the blanket of dough in a plurality of uniform and spaced lines and comprising a plurality of downwardly directed nozzles positioned above the conveyor and directing continuous streams of liquid onto the dough blanket carried by the conveyor, a mounting for said nozzles and extending across the conveyor in spaced relation thereabove, means supplying said liquid to the nozzles, means supporting said mounting for reciprocation longitudinally of the conveyor, and drive mechanism reciprocating said mounting during each operating cycle of the conveyor and moving the mounting forwardly during each intermittent movement of the conveyor through a second distance equalling two-thirds of said first distance and moving said mounting rearwardly through said second distance while the conveyor is stationary, whereby to apply the liquid onto the dough blanket in uniform and predetermined quantities per unit of length of the dough blanket.

5. In a dough biscuit forming and treating machine, the combination of a dough cutting conveyor moving forwardly, cyclically and intermittently through a first distance during each operating cycle for carrying a blanket of dough, said conveyor having a dough-supporting gridwork into which the dough may be pressed for forming biscuits, means pressing the dough into the gridwork for cutting the dough into biscuits, a supply conveyor moving continuously and at a rate identical with the overall average velocity of said dough-cutting conveyor and having a discharge end disposed above said dough-cutting conveyor, a transfer conveyor between the discharge end of said supply conveyor and said dough-cutting conveyor and moving reversely thereof, a reciprocating shuttle frame mounting said transfer conveyor, said transfer conveyor producing a rearwardly extending loop in the dough passing downwardly from the supply conveyor to the dough-cutting conveyor, driving means connected with said supply conveyor and with said dough-cutting conveyor and in driving relation with said transfer conveyor and shuttle frame for increasing and decreasing the length of the loop in the dough as the dough-cutting conveyor is alternately stopped and started during the cyclical intermittent movement thereof, whereby to apply the dough blanket onto the dough-cutting conveyor without stretching the dough blanket, a distributing manifold extending across said dough-cutting conveyor and spaced above the dough thereon and having a plurality of downwardly directed nozzles directing continuous streams of liquid onto the dough blanket carried by the dough-cutting conveyor, means supplying liquid to said manifold, means supporting said manifold for reciprocation longitudinally of the conveyor, and drive means connected with said shuttle frame and with said manifold and producing reciprocation of the manifold during each operating cycle of the shuttle frame and dough-cutting conveyor and moving the manifold forwardly during each intermittent movement of the dough-cutting conveyor through a distance equaling two-thirds of the intermittent movement of said dough-cutting conveyor and moving said manifold rearwardly through said same distance while the dough-cutting conveyor is stationary, the dough-cutting conveyor remaining stationary and moving during two-thirds and one-third respectively of the operating cycle, whereby to apply liquid onto the dough blanket in a uniform and predetermined quantity per unit of length of the dough blanket.

References Cited in the file of this patent

UNITED STATES PATENTS

| 1,529,134 | Kelter | Mar. 10, 1925 |
| 2,478,075 | Baker | Aug. 2, 1949 |
| 2,585,379 | Fulmer | Feb. 12, 1952 |
| 2,664,833 | Armstrong et al. | Jan. 5, 1954 |

UNITED STATES PATENT OFFICE
CERTIFICATE OF CORRECTION

Patent No. 3,120,198

February 4, 1964

Francis R. Reid

It is hereby certified that error appears in the above numbered patent requiring correction and that the said Letters Patent should read as corrected below.

Column 7, line 55, after "supporting" insert -- said --.

Signed and sealed this 23rd day of June 1964.

(SEAL)
Attest:

ERNEST W. SWIDER
Attesting Officer

EDWARD J. BRENNER
Commissioner of Patents